(No Model.)
2 Sheets—Sheet 1.
E. CLIFF.
CAR TRUCK.
No. 539,976.
Patented May 28, 1895.
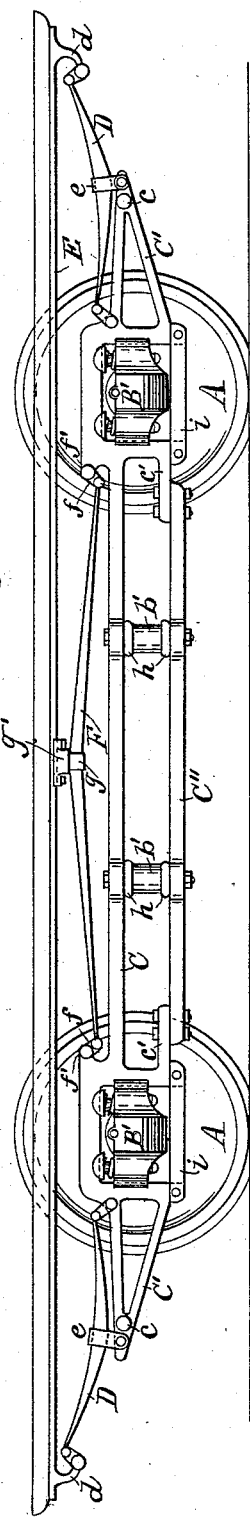
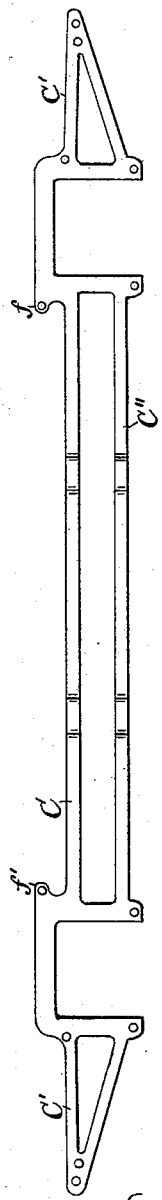
WITNESSES:
Mark W. Dewey
H. M. Seamans
INVENTOR,
Edward Cliff,
By C. H. Duell
his ATTORNEY.

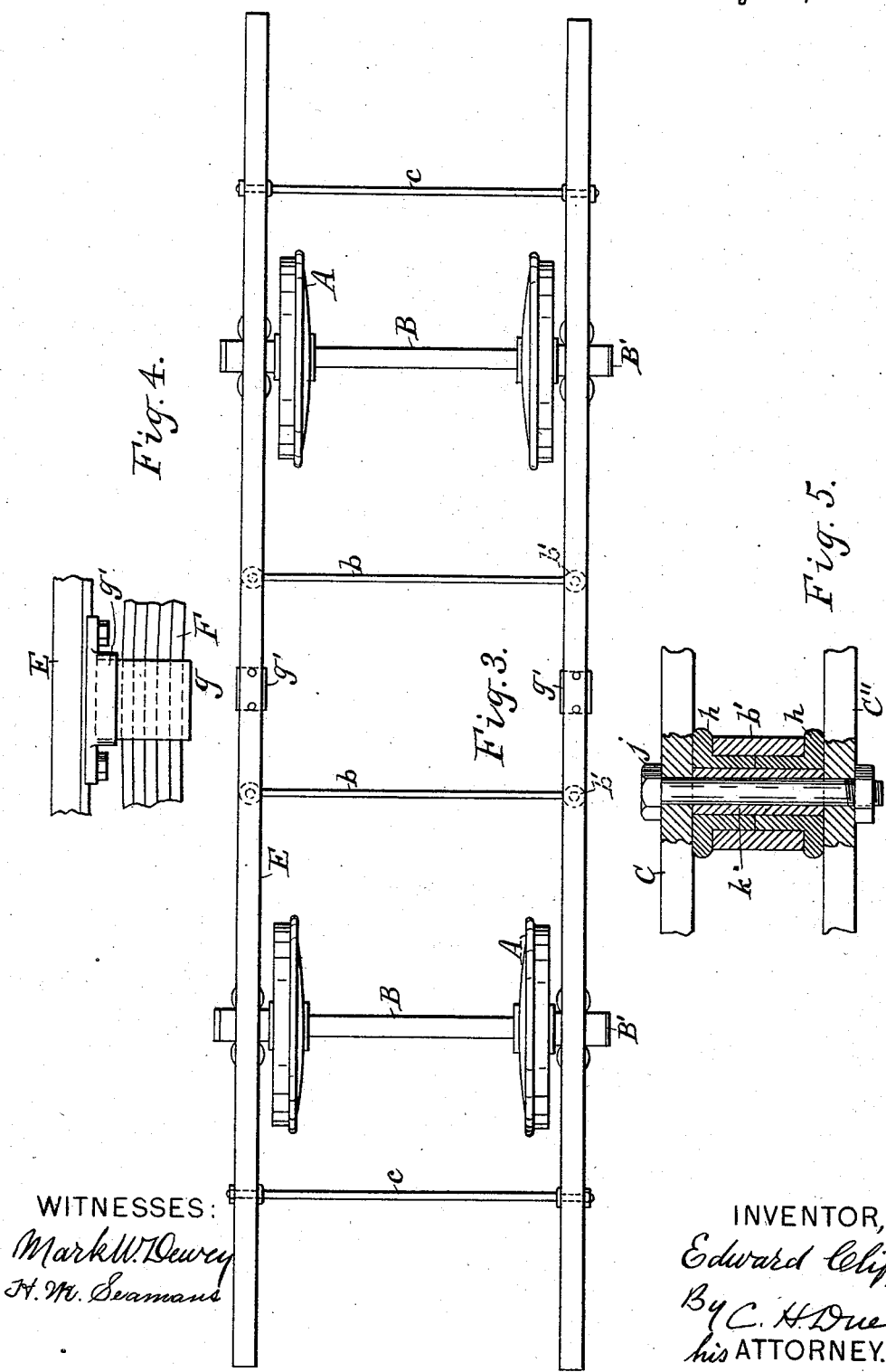

UNITED STATES PATENT OFFICE.

EDWARD CLIFF, OF NEWARK, NEW JERSEY.

CAR-TRUCK.

SPECIFICATION forming part of Letters Patent No. 539,976, dated May 28, 1895.

Application filed March 24, 1894. Serial No. 504,902. (No model.)

*To all whom it may concern:*

Be it known that I, EDWARD CLIFF, of Newark, in the county of Essex, in the State of New Jersey, have invented new and useful Improvements in Car-Trucks, of which the following, taken in connection with the accompanying drawings, is a full, clear, and exact description.

My invention relates to car-trucks, more particularly street car or motor-trucks, and the object is to provide a truck that will ride more easily and at the same time be simple and durable in construction.

The object of my invention also is to dispense entirely with coiled springs between the truck and the body, or the frame which the body rests upon, and to substitute therefor semi-elliptic springs.

To this end my invention consists in the combination with a stationary or lower truck frame, and a movable or upper frame on which the body is supported, of sections of the lower frame extending outwardly from the axles or saddles, half-elliptic springs between the said sections and the upper frame, and a semi-elliptic spring located between the axles or saddles and connecting the two frames together; and my invention consists in certain other combinations of parts hereinafter described and specifically set forth in the claims.

In the drawings hereto annexed and forming a part of this specification, Figure 1 is a side elevation of my improved truck. Fig. 2 is a side elevation of a modified form of truck-frame. Fig. 3 is a plan view of the truck. Fig. 4 is an enlarged view of the bearing between the upper or movable truck-frame and the central semielliptic spring, and Fig. 5 is an enlarged view of one of the yielding bearings of the cross-bars on the frame.

Referring specifically to the drawings, A, A are the wheels, B B, the axles, and B' B' the axle boxes of the truck.

C is the stationary or lower frame of the truck which is preferably made with each side solid or in one piece and the sides joined together by bolts, $c, c$, passing therethrough, one at each end, and cross-bars, $b, b$, near the center connected yieldingly with the sides.
The sides are integral with the saddles over the axles, and are preferably stamped out of plate steel.

C' are extensions of the lower frame extending outwardly from the axles, which form the bed for the end springs, D, D.

The movable or upper frame E upon which the car-body rests is extended in length beyond the ends of the lower frame. On the lower side of the upper frame near its ends are spring hangers, $d, d$, secured thereto and shown integral therewith. The end springs are the lower parts of elliptic springs placed in an inclined position. The inner ends of these springs are connected to the lower frame by links extending upwardly from said frame near the saddles, and the outer and higher ends of the springs are connected to the hangers, $d, d$, by links depending from the said ends of the springs, the center of said springs being secured to the ends of the extensions, C', of lower frame by bands, $e$, passing around the springs and downward upon each side of the sections and bolts extending therethrough. These connections form pivotal bearings for the end springs, D, D allowing free adjustment of springs to varying loads. The central springs F may be longer than the end springs and are preferably the upper parts of elliptic springs. The ends of these springs are secured to the lower frame C, by links, $f, f$, depending from inwardly projecting ears $f' f'$, on the saddles. The centers of these springs, F, are each enveloped by a band, $g$, which is provided with a projection on its top side which enters into a socket, $g'$, secured to the lower side of the upper frame E by bolts. This bearing is shown clearly in the enlarged view in Fig. 4 of the drawings. It will be noticed that there are but three bearings on a side between the upper and lower frames of the truck and that the central bearings are loose, and that by simply detaching the links from the four hangers, $d$, the body or upper frame may be removed from the lower frame. It will be understood that although the central bearings are loose, they cannot be displaced unless the end connections are unfastened as the sockets are of considerable depth and the projections, $g$, are held securely in the sockets by the weight of the car body and the upward pressure due to the elasticity of the springs.

The cross-bars, $b, b$, are provided at their ends with eyes, $b', b'$, which extend and lie between the horizontal parallel bars of the lower frame C. The eyes are cushioned by rings or washers, h, h, of rubber placed above and below the eyes and entering therein; or between the eyes and the said bars. Bolts, j, extend vertically through the said bars, eyes, b', and washers, h, to secure the parts together, and short pieces of pipe, k, are placed around the bolts within the eyes and washers, and extend from the lower side of the upper parallel bar to the upper side of the lower bar C'', to hold the bars apart. The rubber washers or cushions provide yielding bearings for the said cross-bars. Each side of the lower frame, C, may be made in one piece if desired as shown in Fig. 2, but I prefer to make the lower bar C'' of the side removable so that the cross-bars, b, b, and the rubber cushions may be more easily inserted and removed from the frame. When this bar is made removable it is bolted or riveted at each end to the lower side of extensions, c', c', projecting inwardly from the sides of the saddles.

The frame may be removed from the axle-boxes, B', B', as usual by removing the pieces, i, i, bolted to the frame beneath the boxes.

I do not wish to be limited to semi-elliptic end springs as any other suitable and well known springs may be placed at the ends of the truck when long semi-elliptic springs are used at the center.

Any matters shown or described herein but not claimed, are not dedicated to the public, but form the subject matter of another application about to be filed.

Having described my invention, what I claim as new, and desire to secure by Letters Patent, is—

1. The combination with a stationary frame and a movable frame, of extensions of the lower frame extending outwardly from the axles, half elliptic springs between the said extensions and the movable frame, each of said springs having one end connected to the stationary frame and the opposite end connected to the movable frame, and a semi-elliptic spring on each side between the axles and connecting the upper and lower frames together, as set forth.

2. The combination with a stationary frame and a movable frame, of extensions of the lower frame extending outwardly from the axles, half elliptic springs between the said extensions and the movable frame, and the upper half of an elliptic spring extending between and connected to the saddles on each side and connecting the stationary frame with the movable frame, and directly above the side of the stationary frame as set forth.

3. The combination with a stationary frame and a movable frame, of extensions of the lower frame extending outwardly from the axles, half elliptic springs between the said extensions, and the movable frame, each of said springs having one end connected to the stationary frame and its opposite end connected to the movable frame, and the upper half of an elliptic spring extending between the saddles on each side, links depending from ears on the saddles and connected to the ends of the springs, a band around the center of each of the latter springs provided on its upper side with a projection, and a socket secured to the lower side of the movable frame to receive the projection, as and for the purpose described.

4. The combination with a stationary frame and a movable frame, of a semi-elliptic spring between the said frames at each corner, and an upper half of an elliptic spring longer than those at the corners in the center, on each side of the said frames, and between them, the last mentioned springs being linked directly to the saddles on the stationary frame and lying directly above the sides of said frame, as set forth.

5. The combination with the sides of a stationary truck frame having horizontal parallel bars on each side, one above the other, the length of the lower bar being less than the distance between the axles, of cross-bars held between the parallel bars, and means whereby the lower parallel bars may be removed, as and for the purpose described.

6. The combination with the sides of a stationary truck frame having horizontal parallel bars on each side, one above the other, of cross bars extending between the sides, eyes on the ends of the cross-bars between the parallel bars, rubber rings between the eyes and bars, and bolts extending vertically through said parts, as shown and described.

7. The combination with a stationary frame and a movable frame, of extensions of the lower frame extending outwardly from the saddles, springs between the said extensions and the movable frame, and semi-elliptic springs connecting the saddles and the two frames together said semi-elliptic springs being directly over their respective sides of the stationary frame, and lying directly above the sides of the lower frame, as set forth.

8. The combination with the stationary frame and the movable or upper frame, of extensions of the lower frame extending outwardly from the saddles, springs between the said extensions and the movable frame, and the upper part of a semi-elliptic spring on each side extending between the saddles and linked to the latter and having its center bearing over the lower side of the upper or movable frame, said semi elliptic springs being directly over their respective sides of the stationary frame as and for the purpose set forth.

In testimony whereof I have hereunto signed my name.

EDWARD CLIFF. [L. S.]

Witnesses:
VICTOR J. GOETZ,
W. H. GRAHAM.